US011822690B1

(12) United States Patent
Sultan et al.

(10) Patent No.: US 11,822,690 B1
(45) Date of Patent: Nov. 21, 2023

(54) DATA EGRESS VALIDATION

(71) Applicant: Amazon Technologies, Inc., Seattle, WA (US)

(72) Inventors: Hassan Sultan, Seattle, WA (US); Mayank Thakore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 17/156,863

(22) Filed: Jan. 25, 2021

(51) Int. Cl.
*G06F 21/62* (2013.01)
(52) U.S. Cl.
CPC ...... *G06F 21/6227* (2013.01); *G06F 21/6209* (2013.01)
(58) Field of Classification Search
None
See application file for complete search history.

(56) References Cited

U.S. PATENT DOCUMENTS

| 2002/0033844 | A1* | 3/2002 | Levy | G06F 3/0484 715/744 |
| 2002/0132612 | A1* | 9/2002 | Ishii | H04L 67/62 455/414.1 |
| 2003/0055905 | A1* | 3/2003 | Nishiyama | H04L 51/08 709/206 |
| 2004/0025186 | A1* | 2/2004 | Jennings | H04L 47/781 709/227 |
| 2019/0190890 | A1* | 6/2019 | Druker | G06F 21/6245 |

FOREIGN PATENT DOCUMENTS

WO  WO-2013147908  A1 * 10/2013 ....... H04N 21/23476

* cited by examiner

*Primary Examiner* — William J. Goodchild
(74) *Attorney, Agent, or Firm* — K&L Gates LLP

(57) ABSTRACT

Devices and techniques are generally described for centralized data egress validation. In various examples, a request to send first data to a first destination may be received. In some examples, a first decoder that corresponds to a format of the first data may be determined. In further examples, a policy associated with the first decoder may be determined. In some examples, second data may be generated using the first decoder to parse the first data according to the policy. In various examples, the second data may be evaluated using the policy and a determination may be made whether the first data is permissible to send to the first destination.

20 Claims, 8 Drawing Sheets

DATA EGRESS VALIDATION

BACKGROUND

Many computing environments host data that is generated in the course of performing the operations associated with the particular computing environment. In some cases, such environments may differentiate between data identified as being critical and/or sensitive and other data that is non-critical and/or non-sensitive. In some cases, developers may create and deploy data validation systems that satisfy the particular validation requirements specific to their systems and/or hosted data.

DETAILED DESCRIPTION

Figure 1:
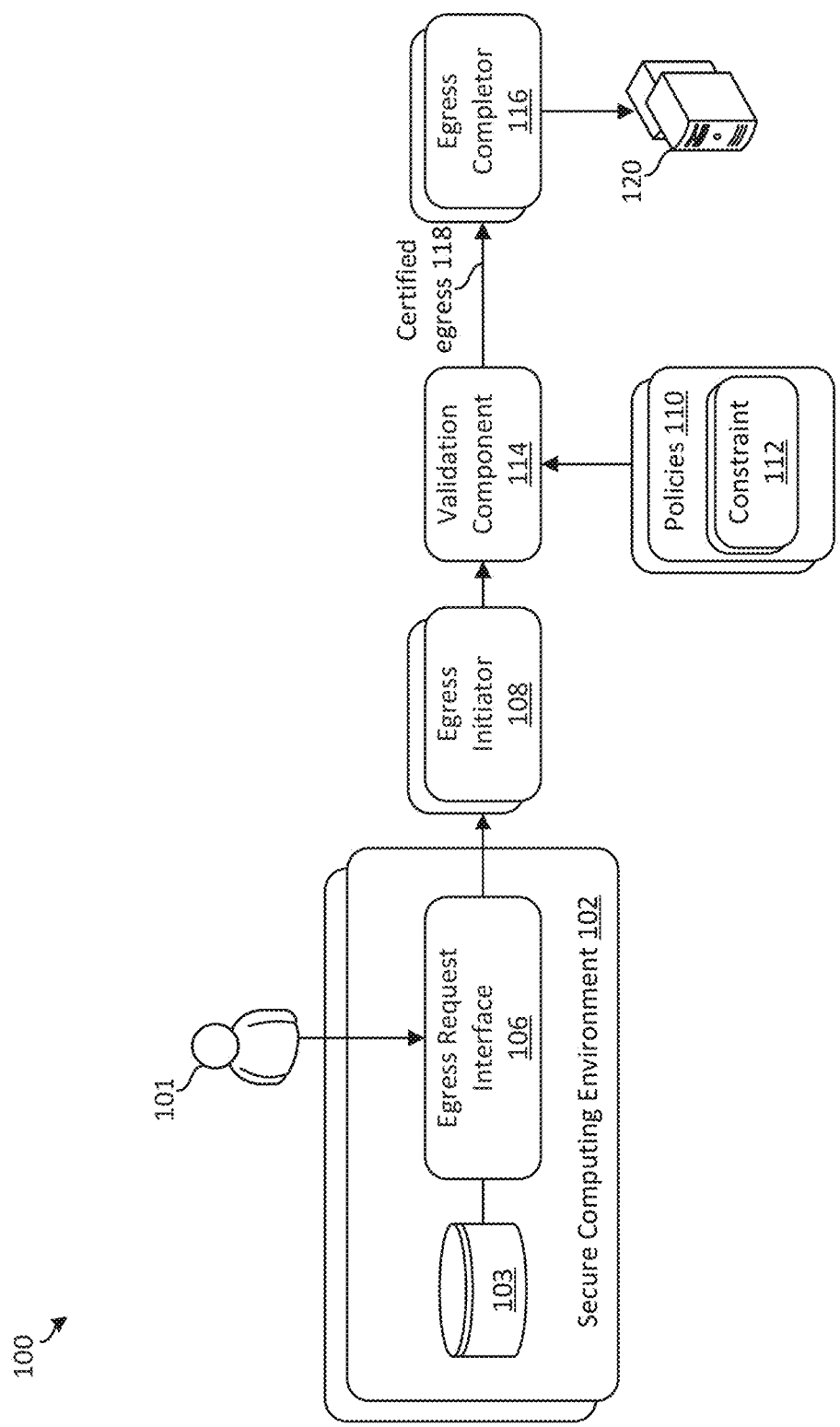
FIG. 1 is a diagram of a data egress validation system, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Various computing environments may be isolated in order to maintain control and/or security over potentially sensitive data. In various examples, data access control systems of such isolated environments may prevent and/or control transfer of certain types of data (e.g., data classified as critical and/or sensitive) out of the environment. Many such systems require deployment of system-specific rules (sometimes referred to as "guardrails") that may be used to control data ingress and/or egress from an isolated environment. In many cases, such rules may be specifically coded for a particular version of an isolated environment. As such, it may be difficult to scale, develop, deploy, and/or maintain such rules. In addition, teams that maintain isolated environments may build different egress validation systems for different egress mechanisms (e.g., email, short message service (SMS), distributed storage services (e.g., Amazon's S3), etc.). However, engineers, developers and/or other users may need to egress various types of data present in isolated computing environments for testing, validation, and/or other purposes that conform to acceptable usage policies. For example, application log files may need to be egressed from a system under test (executing in an isolated computing environment) to a validation system executing outside of the isolated environment. In another example, reports from a system executing in a secure environment may need to be emailed to management.

An isolated computing environment (e.g., a secure computing environment) may be an access-controlled computing environment. In some examples, an isolated computing environment may control the storage and/or usage of data. Secure and/or isolated computing environments may use cryptographic techniques and/or authentication to limit access to data and/or to prevent ingress and egress of data of the secure and/or isolated computing environment. For example, a virtualized computing environment (e.g., a container, virtual machine, etc.) executing on physical hardware may have access controls that limit communication with other physical and/or virtualized computing environments. Such access controls may be implemented by a hypervisor executing the virtualized computing environment and/or by a control plane environment configured to provide constraints on data access, ingress, and/or egress from the isolated virtualized computing environment.

Described herein are systems and techniques for centralized and customizable data egress validation that may be employed by various different isolated computing environments to meet their particular data egress validation requirements. The various data egress validation techniques described herein provide a policy framework and data evaluation service that allows users to submit data egress requests. The requests are validated and the requested data may be egressed upon validation. Previously, egress of data from isolated computing environments could require certification of user code, manual intervention to validate data egress, and/or circumvention of system-specific controls to perform data egress and/or ingress. However, the systems and techniques described herein permit users to programmatically send data to a data egress validation system that validates the request and performs the egress, upon validation.

Administrators (e.g., data protection teams) and/or other privileged users are able to customize policy frameworks that may include various constraints that may be placed on egress of data of specified types. For example, constraints may include limits on the maximum size of egressed files, the number of daily egress requests a particular user can submit for a given data type, constraints on the destination of egressed data, constraints on the content of egressed data, etc.

Data sent to the data egress validation systems described herein may be processed by a decoder that is specific to the relevant data type for extracting information from the data that is relevant to the policies associated with that decoder and/or data type. The policies are then applied by comparing the extracted information to the constraints specified by the relevant policy data. If the data conforms to the applicable policies the data is validated and is denoted as being permissible for egress to the requested location. Conversely, if the egress request violates one or more of the policies egress of the data is prevented and an actionable error message and/or alert may be generated.

The various systems and techniques described herein are discussed in terms of egress of data from isolated computing environments. However, the techniques are equally applicable to ingress (e.g., receipt, processing, and/or storage) of data by isolated computing environments. Accordingly, while many examples discussed herein describe egress of data the techniques also apply to ingress of data.

FIG. 1 is a diagram of a data egress validation system 100, according to various embodiments of the present disclosure. In the example depicted in FIG. 1, a user 101 may request that data stored in non-transitory computer-readable memory 103 be sent to a remote computing device 120. As shown in FIG. 1, non-transitory computer-readable memory 103 may be a memory of a secure computing environment 102. Accordingly, in some examples, in order to egress data from non-transitory computer-readable memory 103 the data egress request may be required to be validated to prevent egress of non-authorized data from the secure computing environment 102. In the example depicted in FIG. 1, user 101 may request the egress of data through an egress request interface 106. As used herein, "egress" of data refers to sending data from one location (typically part of an isolated, access-controlled computing environment) to another location (e.g., to a remote computing device 120).

In the example depicted in FIG. 1, the user 101's request to egress the data from the secure computing environment 102 may be sent to egress initiator 108. In some examples, an egress initiator 108 may be a system that requests egress of data from the secure computing environment 102 (e.g., in response to a user request for egress). In various other examples, the egress initiator 108 may be instantiated as hardware (e.g., one or more computing devices), as software, and/or as some combination of the two. The egress initiator 108 may retrieve the data requested for egress (e.g., one or more files) and may store the data at a location in memory. For example, the egress request may include file path data indicating a location in memory where the file is located. The egress initiator 108 may retrieve the file from the memory using the file path data. Different egress initiators 108 may be associated with different sources from which the data ingress/egress request may be received. In various examples, different egress initiators 108 may be associated with different access levels and/or privileges of the user 101 and/or the particular environment and/or installation of the secure computing environment 102. Egress initiators 108 may represent different users that may be associated with one or more of the secure computing environments 102. For example, a first user with a first access level may be associated with (or may be described as) a first egress initiator 108, while a second user with a second access level may be associated with a second egress initiator 108. In some examples, different egress initiators 108 may be associated with the same or with different secure computing environments 102. As described in further detail below, different policies 110 and constraints 112 may apply to a particular egress initiator 108 (e.g., a first source of an egress request) which may be different than policies 110 and/or constraints 112 for a different egress initiator 108 (e.g., a different source of an egress request). In some cases, the different egress initiators 108 may be requesting egress of the same data type and/or egress from the same secure computing environment 102. However, the different egress initiators 108 may still be associated with different sets of policies 110 and/or constraints 112 as the egress initiators 108 may represent different sources of egress (or ingress) requests. Policies 110 may comprise a set of constraints 112. As described in further detail below, the constraints 112 may be rules used to determine if egress (or ingress) of particular data is permissible or impermissible.

The egress initiator 108 may call validation component 114 for validation of the data that is the subject of the egress request. Validation component 114 may receive the request to egress the data. In some examples, the request may include an indication of the data type (e.g., a name of the file, etc.) to be egressed. In some examples, the request may include a pointer to the location in memory at which the data to be egressed is stored.

The validation component 114 may determine the appropriate decoder for processing the data to be egressed. A decoder may be code that is effective to parse a particular data type to identify constituent data of the data type. For example, there may be a specific decoder associated with comma separated value (CSV) files. CSV files are delimited text files that employ commas to separate values. Each line of the file is described as a data record. Each record comprises one or more fields separated by commas. Accordingly, the use of the comma as a field-separator is a characteristic of the CSV file format. A decoder that is effective to identify and parse CSV files may identify various lines and/or fields and may extract such data for evaluation, as described in further detail below.

In another example, there may be a decoder that is specific to a particular audio file format. The audio file format may comprise uncompressed binary bits embedded in a container format with a defined storage layer. There may be a decoder that is specific to the audio file format such that the decoder can identify files of the audio file format and can parse the files to extract information pertinent to relevant policies (as described in further detail below).

In some examples, the request to egress data may specify the data type of the data to be egressed. For example, the request may indicate that the data to be egressed is a CSV file (and may specify the file name). In such an example, a CSV file decoder (e.g., a decoder that is associated with the CSV format) may be loaded and may evaluate the data to determine if the data conforms to the CSV format. If the decoder recognizes the data (e.g., if the data type specified in the request is the data type associated with the decoder), the validation component 114 may retrieve one or more policies 110 that are associated with the decoder. Thereafter, the decoder may extract the information from the data that is specified by the relevant policies 110 and the validation component 114 may determine whether the extracted information complies with the constraints 112 of the relevant policies 110. If so, the validation component 114 may certify the data for egress (certified egress 118). Certification may comprise generating validation data indicating that the requested data is permissible to send to the requested destination (e.g., computing device 120).

In some other examples, the request to egress data may not specify the data type of the data to be egressed. In such cases, the validation component 114 may load each different decoder (for all data formats supported by the validation component 114) until a decoder recognizes the data type of the data that has been requested for egress. "Recognizing" the data type indicates that the decoder is able to successfully parse the data using the logic of the specific decoder. For example, a decoder may include logic effective to parse files of a specific format to extract values that are relevant to one or more policies that are associated with the decoder (e.g., policies may be associated with the decoder in a lookup table). For example, a CSV decoder distinguishes between different fields of text using commas that separate the fields. Accordingly, the CSV decoder would "recognize"

a CSV file with text separated by commas and organized into different rows. However, the CSV decoder may not recognize an audio file format that consists of only binary bits with no commas.

It is possible that the data type specified in the request for egress may not correspond to the actual data to be egressed—either due to intentional misrepresentation or error. In such cases, the decoder associated with the specified data type will usually not be able to recognize the retrieved data. However, in the event that the decoder erroneously recognizes the retrieved data (e.g., due to the data randomly having a form that resembles the format with which the decoder is associated), the error may be corrected at the policy level. For example, the constraints 112 of the policy may check values of the data against threshold values and/or acceptable values prior to validation.

In some examples, compressed data may be validated using the various techniques described herein. For example, a compressed file envelope may be processed. In some examples, a decoder for the particular compressed data (e.g., for a compressed file envelope) may be used to extract the files/data within the envelope and to determine the policies specific to the underlying files. The policies may include constraints relative to the particular files (e.g., constraints relative to file names, file paths, decompressed file size, description fields, etc.). The validation system may collate the results of both the compressed envelope validation (e.g., validation using policies at the envelope level) and validation of data at the decompressed level in order to return validation data (e.g., "Allow" or "deny") for egress of the compressed data.

If validation component 114 validates the data (e.g., if the egress is certified), validation data indicating that the egress of the data is validated may be sent to egress completor 116. Egress completor 116 may send the validated data to the location specified in the request (e.g., to remote computing device 120).

The various techniques and systems described above may be similarly used for data ingress to a secure computing environment 102. For example, a user 101 may request ingress and/or storage of a particular file into secure computing environment 102 via an ingress request interface. An ingress initiator may receive the file and may send the file to validation component 114. The ingress initiator may be a separate component of egress initiator 108 and/or may represent a different modality of the egress initiator 108 which may be implicated by the request to ingress data. The validation component 114 may determine the appropriate decoder for the file, as described herein with respect to egress. The appropriate policy 110 may be determined. In some examples, the fact that the current request is an egress request or an ingress request may affect the policy determination. For example, some policies 110 may be specific to ingress requests while other policies 110 may be specific to egress requests. Accordingly, metadata indicating whether a particular request is an ingress request or an egress request may be sent to the validation component 114 (e.g., by the egress/ingress initiator and/or by the egress request interface 106). The selected decoder may extract the information from the file that is relevant to the selected policy 110 (e.g., that is used to evaluate the constraints 112 of the selected policy 110). If the policy 110 is satisfied (e.g., if all the constraints 112 of the policy 110 are satisfied), the ingress request may be deemed permissible by the validation component 114. For example, the validation component 114 may generate data indicating that the ingress is permissible. The data indicating that the ingress is permissible may be sent to an ingress completor that may send the file to the secure computing environment 102 (e.g., for processing, storage, etc.).

Figure 2:
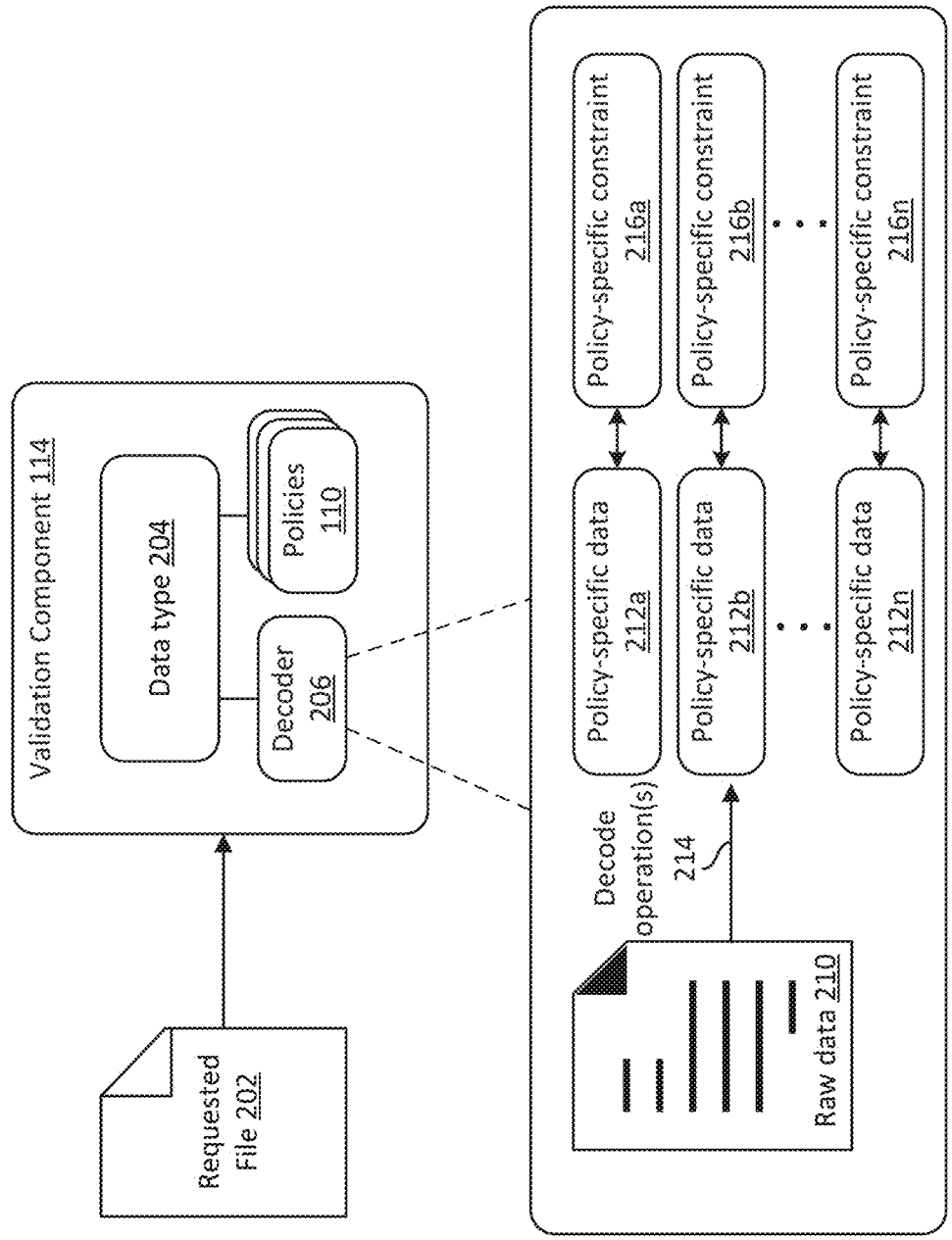
FIG. 2 is a block diagram illustrating an evaluation of data according to a data egress policy, in accordance with various embodiments of the present disclosure.

FIG. 2 is a block diagram illustrating an evaluation of data according to a data egress policy, in accordance with various embodiments of the present disclosure. In the example depicted in FIG. 2, a user has requested egress of requested file 202 outside of an isolated computing environment. Accordingly, validation component 114 retrieves requested file 202. In the example of FIG. 2, the request may specify a data type 204 of the requested file 202. Accordingly, the validation component 114 retrieves the decoder 206 that is associated with the data type 204. For example, the data type 204 may indicate that the requested file 202 is of the JPEG format (e.g., an image file). Accordingly, decoder 206 may be effective to recognize and parse JPEG files.

Decoder 206 may evaluate the requested file 202 to ensure that the decoder 206 recognizes the file type. Assuming that the decoder 206 is able to parse the requested file 202 the validation component 114 may retrieve the policies 110 that are associated with the data type 204 (and the decoder 206). The policies 110 may be policies that are associated with validation of data of the particular data type 204. For example, the policies 110 may have been written and/or implemented by an administrator of the secure computing environment 102 to selectively control egress of data of the particular data type 204 from the secure computing environment 102.

Decoder 206 may extract raw data 210 from the requested file 202. The raw data 210 may be the information in the requested file 202 that is pertinent to the policies 110. For example, a first constraint of a policy 110 (e.g., policy data) may relate to a size of the requested file 202. For example, the first constraint may prohibit egress of files of the particular format that are larger than 1 MB. Accordingly, the decoder 206 may parse a header (or some other metadata) of the raw data 210 of the requested file 202 to identify a file size of the file using decode operations 214 to generate the policy-specific data (e.g., policy-specific data 212a, 212b, 212n). In the current example, the policy specific data may be the file size of the requested file 202. The policy-specific data may be compared to the appropriate constraint for which the policy-specific data was extracted. In the current example, the actual file size of the requested file 202 may be compared to the threshold size specified by the policy-specific constraint (e.g., <=1 MB) to ensure that the requested file 202 is less than or equal to 1 MB in size. A policy may have any number of constraints.

The decoder 206 may determine the data that should be extracted from the raw data 210 according to the policy-specific constraints 216a, 216b, ..., 216n of the policies 110 that are associated with the data type 204 and the decoder 206. After determination of the data that should be extracted for evaluation of the policy-specific constraints 216a, 216b, ..., and 216n, the decoder 206 may use the appropriate decode operations 214 to extract the policy-specific data 212a, 212b, ..., 212n. In the example of FIG. 2, policy-specific data 212a is relevant to policy-specific constraint 216a, policy-specific data 212b is relevant to policy-specific constraint 216b, etc.

Examples of policy-specific constraints may include local rules (e.g., file sizes less than X KB, total egress volume per-user, per-day less than Y KB, etc.) and/or external plugins. For example, a constraint may indicate that the value of a particular field is to be validated against the values of a remote database to ensure that the value of the field is found in the database (e.g., an allow list) or is not found in the database (e.g., a deny list). In general, the policies and constraints are customizable and may be defined by a privileged user according to the data egress and/or access control needs of the particular environment and/or data.

In various examples, particular users 101 and/or different egress initiators 108 may be associated with different policies and/or policy exceptions relative to other users (e.g., users of the same secure computing environment 102). For example, a first user may have a privilege level indicating that a particular policy 110 and/or constraint 112 is not applicable for the particular user, even while the policy 110 and/or constraint 112 is applicable for other users of the secure computing environment 102. In addition, policies 110 and/or constraints 112 may be specific to a particular installation of a particular computing environment, resulting in different policies 110 and/or constraints 112 being applicable for different instances of a secure computing environment 102 (e.g., different installations of the same environment). For example, an installation of a system in a system under test may have reduced restrictions on data egress (implemented using a first set of policies), while the same system may have elevated restrictions on data egress when, in a production environment.

In some examples, the data type 204, decoder 206, and/or policies 110 may be grouped in a particular namespace, while other namespaces may have different groupings, even for the same system and/or secure computing environment. For example, a user interacting with namespace A may have a first grouping of data type 204 associated with a first decoder 206 and a first set of policies 110, while a user interacting with namespace B may have a second grouping of data type 204, associated with a second decoder 206 and a second set of policies 110. In another example, a first grouping (e.g., a first namespace or other grouping) may specify data type 1, decoder 2, and policy 3. However, a second grouping may specify the same data type 1, the same decoder, 2, but a different policy 4 (or different set of policies).

As previously described, policies 110 may also be used to evaluate requested ingress of data into a secure computing environment. In some examples, a particular policy 110 may be specific to data ingress or data egress. Further, as described herein, a particular policy 110 may be associated with a particular data type (and/or a decoder for that data type) and may be used to validate ingress and/or egress requests of that data type. For example, policy A may be associated with validating egress requests of data type A. Accordingly, when a request to egress data of data type A is received, the appropriate decoder 206 for data type A may be determined, as described herein. The appropriate policy 110 for egress of data type A may be determined. The decoder 206 determined for data type A may be used to parse the data requested for egress to extract the specific values, metadata, etc., relevant to constraints of the determined policy 110. Thereafter, the extracted values, metadata, etc., may be evaluated using the constraints of the determined policy 110 to determine whether or not the data egress request is validated. The same procedure may be used for data ingress (although, as previously noted, different policies, and thus different constraints may be relevant to a data ingress request).

Figure 3:
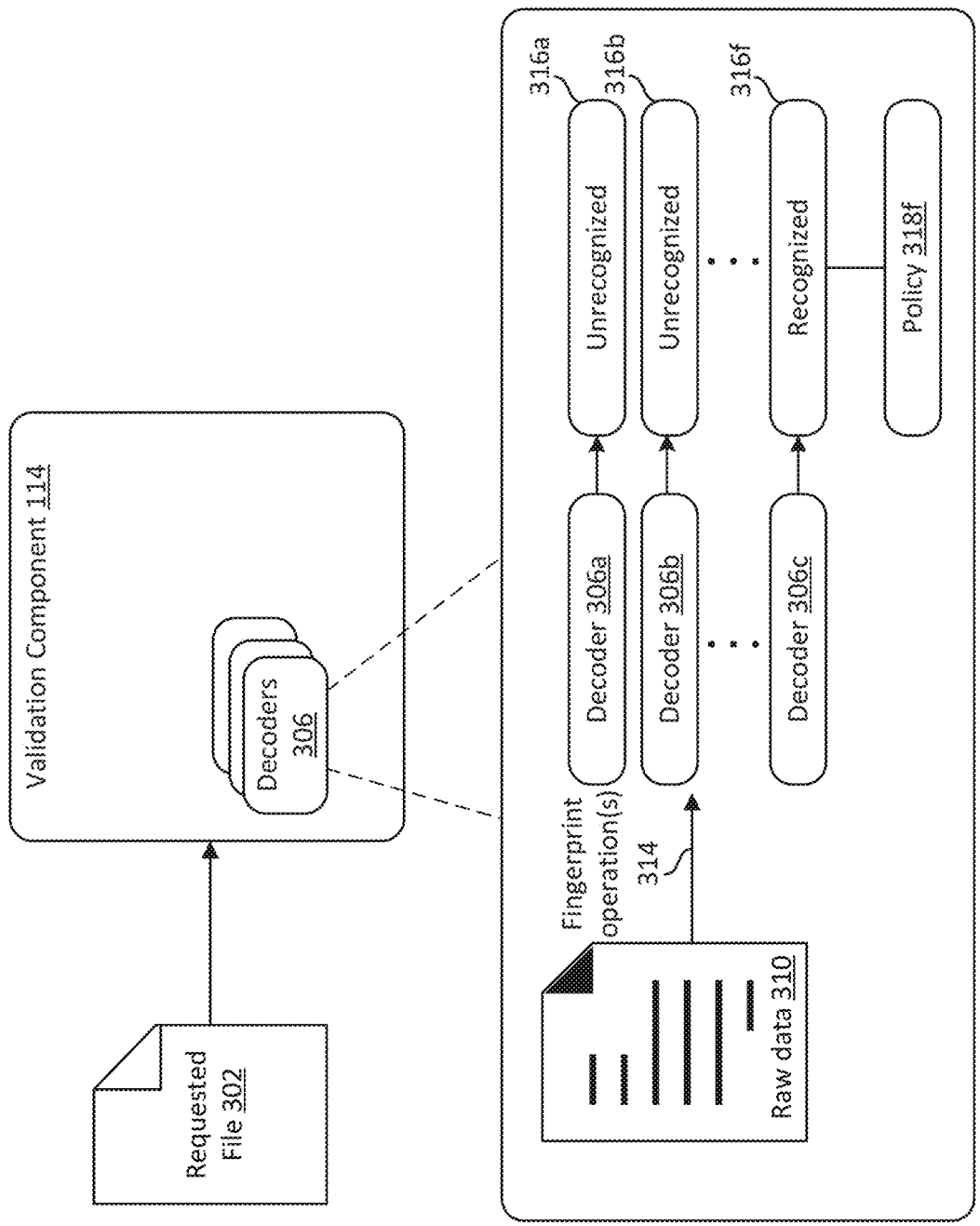
FIG. 3 is a block diagram illustrating selection of a decoder for data egress validation, in accordance with embodiments of the present disclosure.

FIG. 3 is a block diagram illustrating selection of a decoder for data egress validation, in accordance with embodiments of the present disclosure. In the example depicted in FIG. 3 the validation request for egress of requested file 302 may not include a specified data type. Accordingly, the validation component 114 may evaluate the requested file 302 using each registered decoder 306 until a decoder 306 is determined that recognizes the format of the requested file 302.

Accordingly, as shown in FIG. 3, the raw data 310 of the requested file 302 may be evaluated using fingerprint operation(s) 314 particular to each decoder 306a, 306b, 306c, etc. In various examples, the decoders 306 may be sequentially used to evaluate the raw data 310 until a decoder that recognizes the format (e.g., the data type) is determined. In the example of FIG. 3, decoder 306a may initially attempt to parse the raw data 310 using logic of the decoder 306a (e.g., a fingerprint operation specific to decoder 306a to determine if the file format is of the type associated with decoder 306a). In the example, decoder 306a is unable to successfully parse the raw data 310. Accordingly, decoder 306a may generate data 316a indicating to the validation component 114 that the requested file 302 is not recognized by the decoder 306a. Accordingly, the validation component 114 may load decoder 306b. In the example, decoder 306b is likewise unable to successfully parse the raw data 310. Accordingly, decoder 306b may generate data 316b indicating to the validation component 114 that the requested file 302 is not recognized by the decoder 306b. For example, the requested file 302 may be unrecognized by logic of the decoder 306b.

The validation component 114 may continue to load decoders 306 until a decoder 306 recognizes the format of the requested file 302. In the example depicted in FIG. 3, the decoder 306b is able to successfully parse the raw data 310 according to the logic of the decoder 306c. Accordingly, decoder 306c may generate data 316f indicating that to the validation component 114 that the requested file 302 is recognized by the decoder 306c. For example, the requested file 302 may be of a recognized file type.

In some examples, a policy owner (e.g., a system administrator, etc.) may specify the order of the performing of fingerprint operation(s) 314 by decoders 306a, 306b, 306c, etc. Any order may be specified according to the policy owner. For example, a policy owner may specify decoders 306a, 306b, 306c, etc., in terms of priority of data types 204. In an example, a policy owner may specify the most discriminatory decoder first, followed by less discriminator decoders. For example, a CSV decoder may expect fields separated by commas. Accordingly, the CSV decoder may use a fingerprint function to incorrectly interpret a JSON file as being a CSV file if the JSON file happens to include commas. Accordingly, the policy owner may specify that fingerprint functionality of a JSON decoder be used prior to the CSV decoder, in order to avoid the CSV decoder incorrectly interpreting JSON files as CSV files.

In response, the validation component 114 may load each policy 318f that is associated with the data type and the decoder 306c. The decoder 306c may thereafter determine the information from the raw data 310 that is required for evaluation of the policy 318f (e.g., for constraints of the policy 318f).

Figure 4:
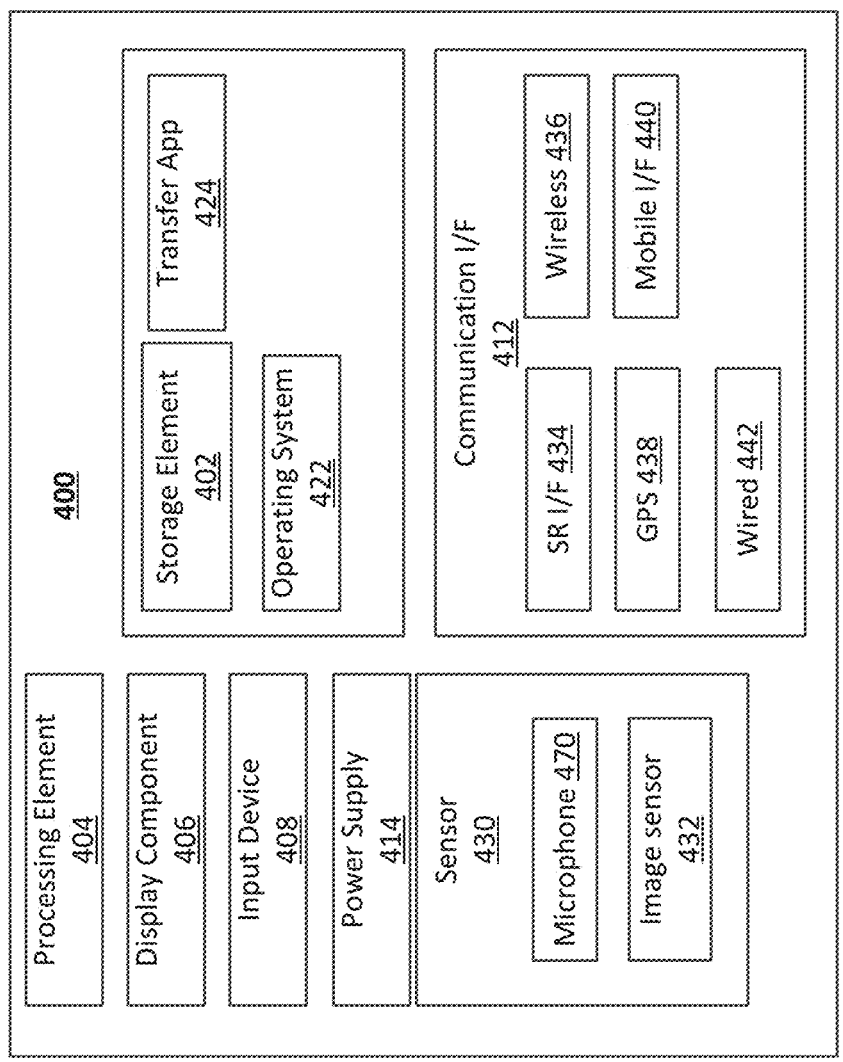
FIG. 4 is a block diagram showing an example architecture of a computing device that may be used in accordance with various embodiments described herein.

FIG. 4 is a block diagram showing an example architecture 400 of a computing device that may be used to access and/or implement one or more components of the various data egress validation components and/or techniques described herein. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or computer-readable memory devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. Additionally, storage element 402 may store various policy instructions, decoder instructions, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400.

When implemented in some user devices, the architecture 400 may also comprise a display component 406 and/or be configured in communication with one or more external display components 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the data egress validation system 100, as described herein, are exemplary, and may be located as a stand-alone device or may be included, in whole or in part, as a component of a larger device or system.

Figure 5:
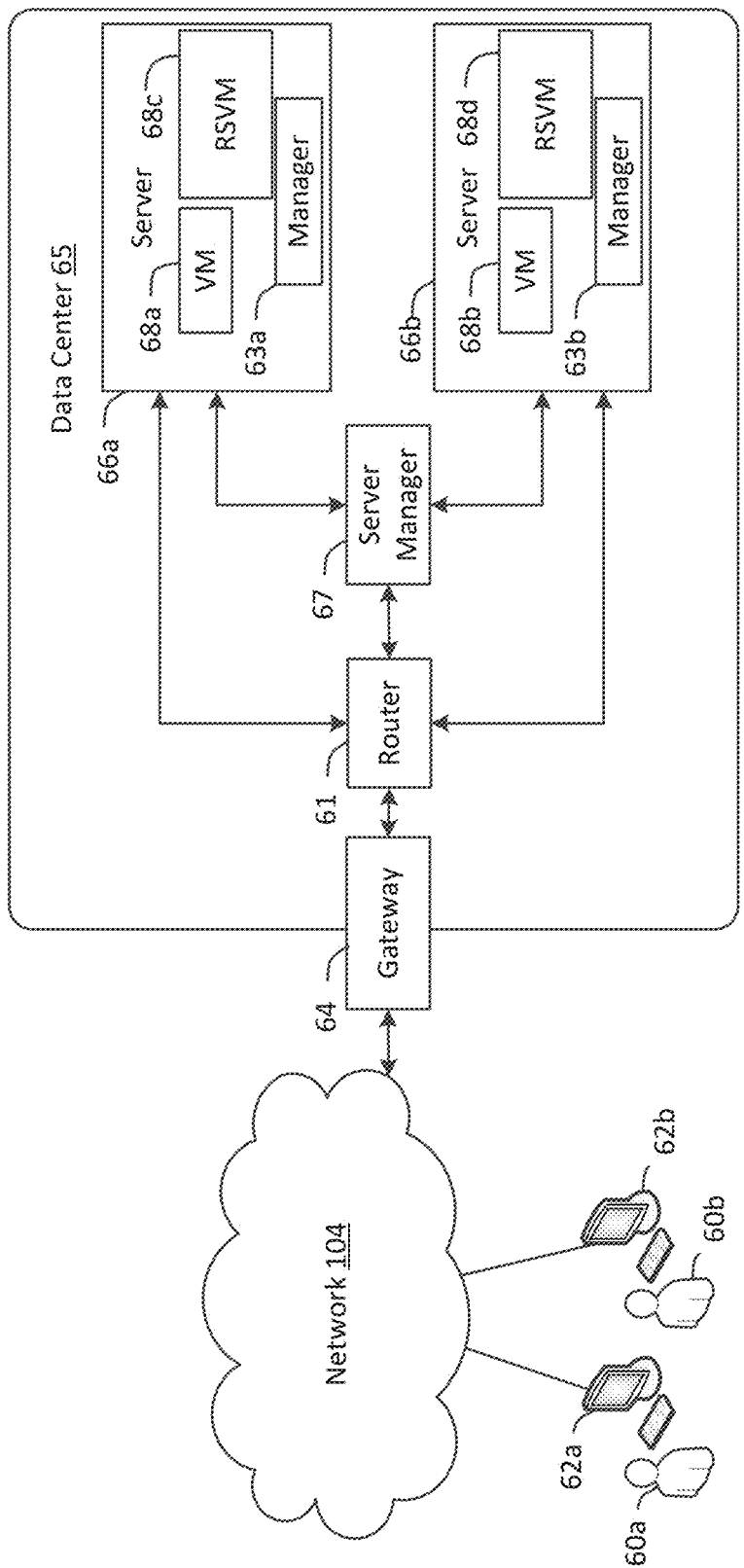
FIG. 5 is a diagram illustrating an example system for sending and providing data that may be used in accordance with the present disclosure.

An example system for sending and providing data and processing data of natural language processing systems will now be described in detail. In particular, FIG. 5 illustrates an example computing environment in which the embodiments described herein may be implemented. For example, the computing environment of FIG. 5 may be used to provide natural language processing as a service over a network wherein one or more of the techniques described herein may be requested by a first computing device and may be performed by a different computing device configured in communication with the first computing device over a network. FIG. 5 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 5 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 5, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 5, a data center 65 is also employed to at least in part direct various communications to, from and/or between servers 66a and 66b. While FIG. 5 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 65 described in FIG. 5 is merely illustrative and that other implementations might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 6:
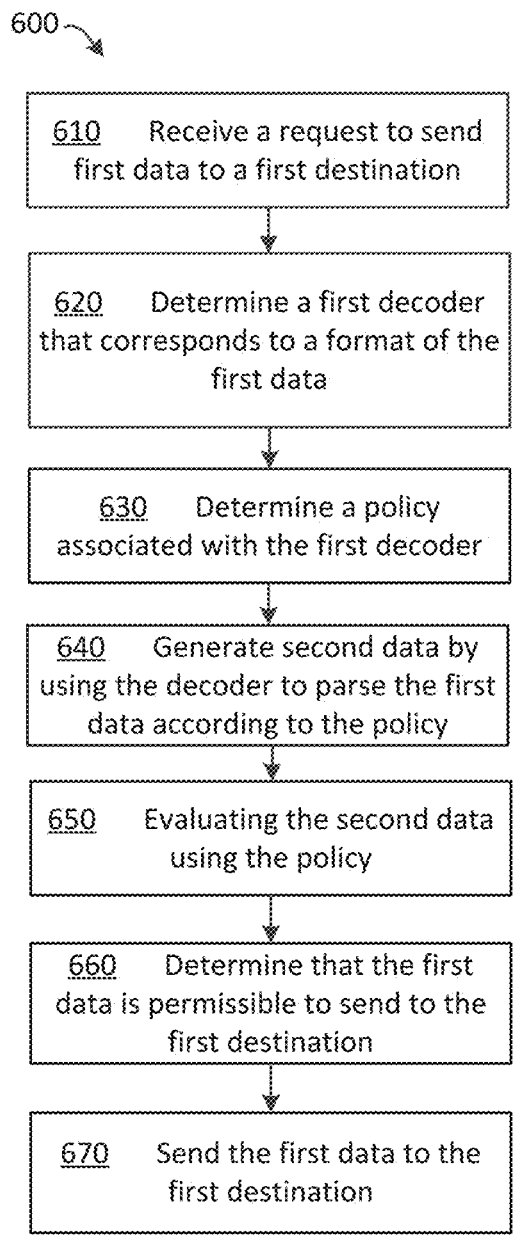
FIG. 6 depicts a flow chart showing an example process for validating egress of data, in accordance with various aspects of the present disclosure.

FIG. 6 depicts a flow chart showing an example process 600 for validating egress of data, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 of FIG. 6 may begin at action 610, at which a request to send data to a first destination may be received. In various examples, the request may be a request to egress data from an isolated computing environment (e.g., secure computing environment 102) to some other location that is outside of the isolated computing environment. The request may be received, for example, by egress request interface 106.

Processing may continue to action 620, at which a first decoder that corresponds to a format of the first data may be determined. In some examples, the first decoder may be determined from a data type that is specified by a user in the request received at action 610. For example, a user may indicate (e.g., using egress request interface 106) that a file requested for egress is a .JPEG file. In some other examples, the data requested to be egressed may be retrieved and evaluated using each registered decoder of the validation component (e.g., validation component 114) until a decoder recognizes the format of the data. Different decoders may be configured to recognize different data formats. For example, a CSV decoder for parsing CSV files may expect different fields of a file to be separated by commas and different records of the file to start on new lines. If a file being evaluated by the CSV decoder does not correspond to such formatting, the CSV decoder may be unable to recognize the file. Accordingly, different decoders may be used to attempt to recognize the file until the appropriate decoder is determined. As previously described, in some examples, the order in which decoders are used to attempt to recognize a file for egress or ingress may be specified. Further, if a file is incorrectly recognized (e.g., an audio file is determined to be a CSV file by the CSV decoder) the error may be determined at the policy level. In the foregoing example, the constraints of the CSV file may not be met by the extracted raw data of the audio file (and/or values of the raw data may not be recognized by the policy) and egress may be prevented.

Processing may continue at action 630, at which a policy associated with the first decoder may be determined. In various examples, each decoder that is registered with the validation component 114 may be associated with one or more policies. A lookup table and/or other data structure may associate each decoder with one or more applicable policies. Accordingly, the decoders may be associated with the relevant policies in memory. The policies may be supplied by a user having elevated privileges. The policies may be used to define permissible and/or impermissible data egress from the isolated computing environment.

Processing may continue at action 640, at which second data may be generated by using the decoder to parse the first data according to the policy. In various examples, the policy determined at action 630 may specify particular data of the data being evaluated for egress for evaluation using constraints of the policy. For example, the policy may require that particular fields and/or metadata (e.g., the second data of action 640) of the data to be egressed be evaluated using constraints of the policy to ensure that the data to be egressed conforms to the policy and may thus be validated for egress. Conversely, if the particular data (e.g., the second data of action 640) violates the constraints the data may be determined to not conform to the policy and may thus be designated as impermissible for egress outside of the secure computing environment. The decoder may include logic effective to determine the particular portions of the data to be extracted that correspond to the policy. Accordingly, these portions of the data may be extracted and evaluated against the constraints of the policy.

Processing may continue at action 650, at which the second data may be evaluated using the policy. At 650, the data that is relevant to the policy that was extracted from the data to be egressed (e.g., particular values, fields, metadata, header information, etc.) may be evaluated using constraints of the policy. For example, a determination may be made whether the user requesting the egress has requested egress of more than 750 KB of data in the last 24 hours. In another example, a determination may be made whether a particular field of the data to be egressed comprises an acceptable value (or an impermissible value). In general, the constraints and policies are customizable and may thus take a wide variety of forms depending on the particular policy/constraint.

Processing may continue at action 660, at which a determination may be made that the first data is permissible to send to the first destination. For example, a determination may be made that the data requested for egress conforms to all applicable policies (e.g., all policies that are associated with the particular data type, decoder, and/or user).

Processing may continue at action 670, at which the first data may be sent to the first destination. At action 670, upon validation of the data for egress, the egress completor 116 may send the data to the relevant location. In some examples, the request may specify a particular modality for sending the data. Accordingly, in some examples, the egress completor 116 may send the data according to the specified modality (e.g., email, SMS, etc.).

Figure 7:
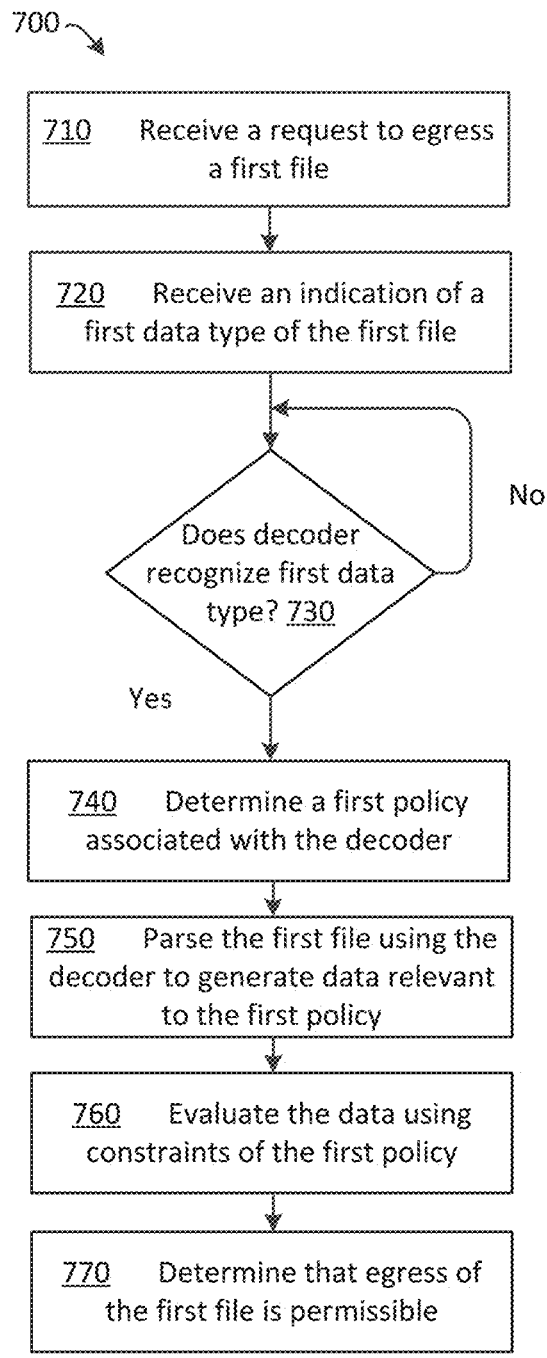
FIG. 7 depicts a flow chart showing another example process for validating egress of data, in accordance with various aspects of the present disclosure.

FIG. 7 depicts a flow chart showing another example process 700 for validating egress of data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which a request to egress a first file may be received. In various examples, the request may be a request to egress a first file from an isolated computing environment (e.g., secure computing environment 102) to some other location that is outside of the isolated computing environment. The request may be received, for example, by egress request interface 106.

Processing may continue at action 720, at which an indication of a first data type of the first file may be received. In various examples, the indication of the first data type may be included in the request. For example, the indication may be data indicating that the first file is a CSV file, a PNG file, etc.

Processing may continue at action 730, at which a determination may be made whether a decoder recognizes the first data type. At action 730, initially, the decoder that is associated with the data type specified at action 720 may be loaded and used to evaluate the first file. In at least some examples, a lookup may be performed wherein the first data type received at action 720 is used to lookup a decoder that is associated with the first data type. The decoder may evaluate the file, as described, below to determine whether the decoder is successfully able to parse the file. If the decoder is successfully able to parse the first file and thus recognizes the first file, processing may proceed to action 740. However, if the decoder is unable to successfully parse the first file, each registered decoder may be loaded and used to attempt to recognize the file. Upon recognition of the file by a decoder, that decoder may be selected as the decoder for processing the first file and processing may proceed to action 740.

Each decoder may be specific to a particular data type (e.g., file format). Accordingly, the logic of the decoder may parse the files according to the format in order to validate that the file is of the format for which the decoder is intended. For example, a decoder specific to file format A may expect one of a set number of values in a particular header field. If the file requested for ingress or egress does not have one of the set values in the relevant header field, the decoder may not recognize the file and another decoder may be used to attempt to recognize the file until a decoder that recognizes the file is located. Accordingly, the decoder may parse the file at least in part by checking the particular header field for one of the set number of values. In another example, the decoder specific to a file format B may expect a repeating value every X number of bytes defining a particular field. The decoder may parse the file at least in part by checking to determine if the repeating value is present. If so, the decoder may recognize the format as being of file format B. The logic used by a decoder to recognize the file format for which the decoder is developed is, by design, specific to the decoder and the relevant file format. Once a decoder is found that is able to recognize the format of the first file, processing may continue to action 740.

At action 740, a first policy associated with the first decoder may be determined. In various examples, each decoder that is registered with the validation component 114 may be associated with one or more policies. The policies may be supplied by a user having elevated privileges (e.g., an administrator of the secure computing environment). The policies may be used to define permissible and/or impermissible data egress from the isolated computing environment.

Processing may continue to action 750, at which the first file may be parsed using the first decoder to generate data relevant to the first policy. In various examples, the first policy determined at action 740 may specify particular data of the data being evaluated for egress for evaluation using constraints of the first policy. For example, the first policy may require that particular fields and/or metadata of the first file be evaluated using constraints of the first policy to ensure that the first file conforms to the first policy and may thus be validated for egress. Conversely, if the particular data (e.g., the data extracted from the first file relevant to the first policy) violates the constraints the first file may be determined to not conform to the first policy and may thus be designated as impermissible for egress outside of the secure computing environment. The first decoder may include logic effective to determine the particular portions of the data to be extracted that correspond to the first policy. Accordingly, these portions of the first file may be extracted and evaluated against the constraints of the first policy.

Processing may continue at action 760, at which the data may be evaluated using constraints of the first policy. At 760, the data that is relevant to the first policy that was extracted from the first file (e.g., particular values, fields, metadata, header information, etc.) may be evaluated using constraints of the first policy. For example, a determination may be made whether the user requesting the egress has requested egress of more than 750 KB of data in the last 24 hours. In another example, a determination may be made whether a particular field of the data to be egressed comprises an acceptable value (or an impermissible value). In general, the constraints and policies are customizable and may thus take a wide variety of forms depending on the particular policy/constraint.

Processing may continue to action 770, at which a determination may be made that egress of the first file is permissible. For example, a determination may be made that the first file conforms to all applicable policies (e.g., all policies that are associated with the particular data type, decoder, and/or user).

Figure 8:
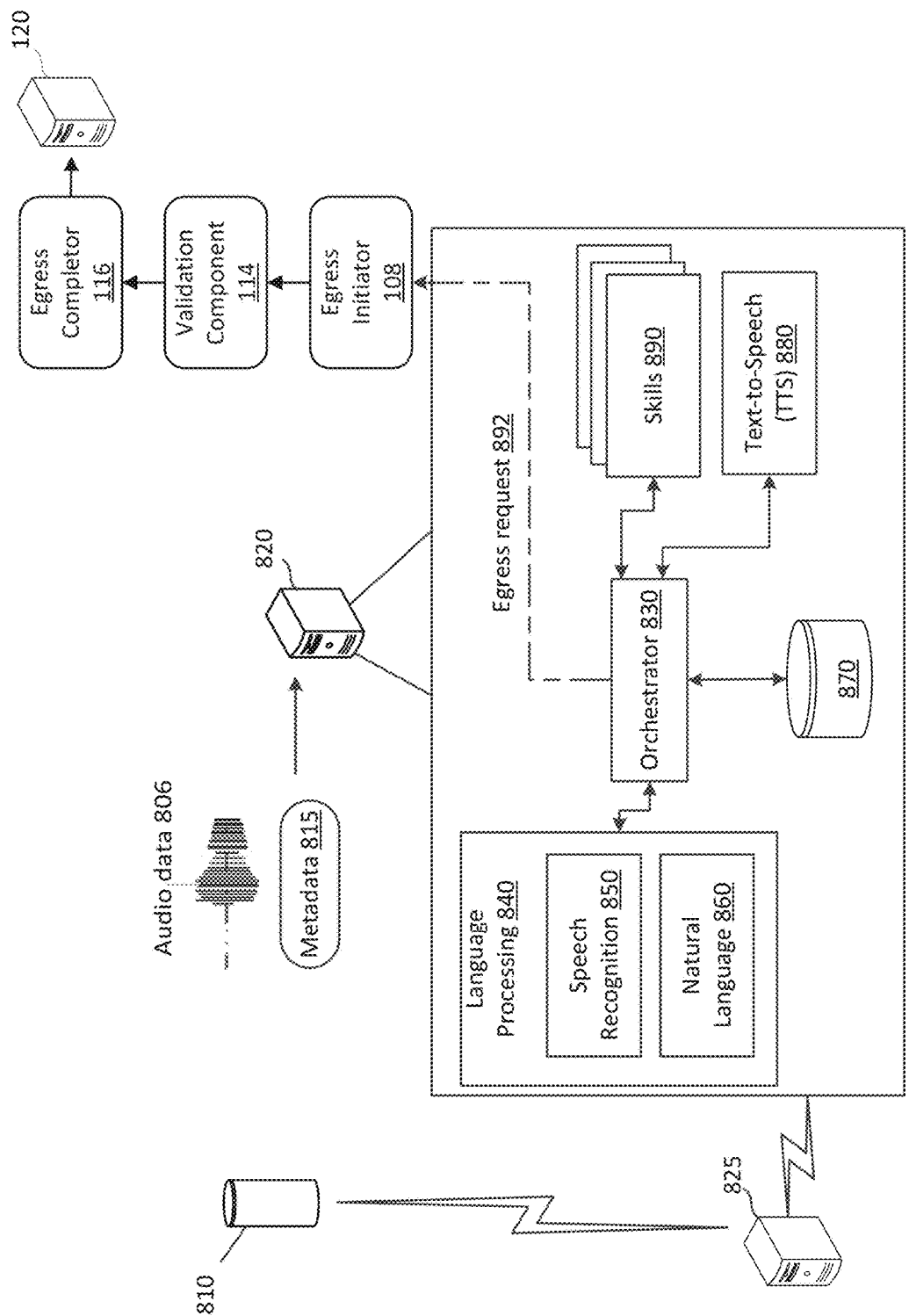
FIG. 8 depicts an example interaction between a natural language processing system and a data egress validation system, in accordance with various techniques described herein.

FIG. 8 depicts an example interaction between a natural language processing system and a data egress validation system, in accordance with various techniques described herein. The speech processing system implemented by one or more of the components depicted in FIG. 8 may be an example of an isolated computing environment that may employ validation component 114 in order to validate data for egress to another system. For example, reports and/or machine learning model metrics and/or log data may be validated and egressed according to the relevant policies. However, some other data types may not be validated for egress from the speech processing system. For example, files representing user speech and/or natural language inputs (e.g., text files, audio files, and/or video files) may not be permissible to egress from the speech processing system in order to avoid egressing potentially sensitive data from the isolated computing environment.

The example speech processing system of FIG. 8 is now described in more detail. The various components illustrated FIG. 8 may be located on the same or different physical devices. Communication between various components illustrated in FIG. 8 may occur directly or across a network. A speech processing enabled device(s) 810 may capture audio using an audio capture component, such as one or more microphone(s). The speech processing enabled device(s)

810 may send audio data 806 (e.g., representing a spoken user request), corresponding to spoken audio, to the speech processing computing device(s) 820. The speech processing enabled device(s) 810 may include a wakeword detection component that detects when input audio includes a spoken wakeword. In some instances, the speech processing enabled device(s) 810 may be configured to send audio data 806 to the speech processing computing device(s) 820 when the speech processing enabled device(s) 810 detects a spoken wakeword. The speech processing enabled device(s) 810 may also send metadata 815 (e.g., including encoded states of speech processing enabled device(s) 810, timestamp data, etc.) to the speech processing computing device(s) 820. The metadata 815 may be created by a computing component of the speech processing enabled device(s) 810.

Upon receipt by the speech processing computing device(s) 820, the audio data 806 may be sent to an orchestrator 830. The orchestrator 830 may include memory and logic that enables the orchestrator 830 to transmit various pieces and forms of data to various components of the system. In various examples, orchestrator 830 may be configured in communication with egress initiator 108 and the validation component 114 of the data egress validation system.

The orchestrator 830 may send the audio data 806 to a language processing component 840. An ASR component 850 (e.g., a speech recognition component) of the language processing component 840 transcribes the audio data 806 into one or more hypotheses representing speech contained in the audio data 806. The ASR component 850 interprets the speech in the audio data based on a similarity between the characteristics of the audio data corresponding to the speech and pre-established language models. For example, the ASR component 850 may compare the audio data 806 with models for sounds (e.g., subword units such as phonemes) and sequences of sounds to identify words that match the sequence of sounds in the speech represented in the audio data 806. The ASR component 850 may send text data generated thereby to a Natural language component 860 of the language processing component 840. The text data output by the ASR component 850 may include a top scoring hypothesis of the speech represented in the audio data 806 or may include an N-best list including a group of hypotheses of the speech represented in the audio data 806, and potentially respective scores ASR processing confidence scores.

The natural language component 860 attempts to make a semantic interpretation of the phrases or statements represented in the text data input therein. That is, the natural language component 860 determines one or more meanings associated with the phrases or statements represented in the text data based on individual words represented in the text data. The natural language component 860 interprets a text string to derive an intent of the user (e.g., an action that the user desires be performed) as well as pertinent pieces of information in the text data that allow a device (e.g., the speech processing computing device(s) 820, the skill computing device(s) 825, etc.) to complete the intent. For example, if the text data corresponds to "Play the new album by [Musical Artist]", the natural language component 860 may determine the user intended to invoke a music playback intent with to play the relevant album. In various examples, the metadata 815 may be an indication of data displayed and/or output by speech processing enabled device(s) 810 and/or data related to a current device state of speech processing enabled device(s) 810.

The speech processing computing device(s) 820 may include a storage 870. The storage 870 may include a variety of information related to individual users, groups of users, etc. that interact with the system. For example, the storage 870 may store user data, device data, log data related to operation of various components of the speech processing system, contextual data, etc. The user storage 870 may include one or more profiles. Each profile may be associated with a different identifier (ID), such as an identifier of speech processing enabled device(s) 810. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and other speech processing enabled devices of those users. A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user storage 870 is implemented as part of the speech processing computing device(s) 820. However, it should be appreciated that the user storage 870 may be located proximate to the speech processing computing device(s) 820, or may otherwise be in communication with the speech processing computing device(s) 820, for example over a network(s).

The speech processing computing device(s) 820 may include one or more skills 890 configured to perform the various techniques herein disclosed, as well as other, processes. The speech processing computing device(s) 820 may also be in communication with one or more skill computing device(s) 825 that execute one or more skills configured to perform the herein disclosed, as well as other, processes. To enable a skill 890 to execute, orchestrator 830 may send output from the Natural language component 860 (e.g., text data including tags attributing meaning to the words and phrases represented in the text data), and optionally output from the storage 870 to the skill 890.

The speech processing computing device(s) 820 may also include a TTS component 880 that synthesizes speech (e.g., generates audio data) corresponding to text data input therein. The TTS component 880 may perform speech synthesis using one or more different methods. In one method of synthesis called unit selection, the TTS component 880 matches text data against one or more databases of recorded speech. Matching units are selected and concatenated together to form audio data. In another method of synthesis called parametric synthesis, the TTS component 880 varies parameters such as frequency, volume, and noise to create an artificial speech waveform output. Parametric synthesis uses a computerized voice generator, sometimes called a vocoder.

The various components (830/840/850/860/880/890) described above may exist in software, hardware, firmware, or some combination thereof.

In various examples, a user may want to send some data from storage 870 and/or from some other component of the speech processing system displayed in FIG. 8 to remote computing device 120. In the example, the speech processing system and/or components executing on speech processing computing device(s) 820 may be in an isolated computing environment. Accordingly, the user request to egress the data may be sent to egress initiator 108 (e.g., as egress request 892).

As previously described, in some examples, the user may make specify a data type of the data to be egressed. For example, the data to be egressed may be an application log in the CSV file format that is generated by a component of the speech processing system. The validator component 114 may retrieve the decoder associated with the specified data type (e.g., CSV files). If the decoder is able to recognize the file (e.g., if the decoder can parse the fields and records of the CSV file), the policies associated with the data type are retrieved. The decoder may then extract the information relevant to the policy from the CSV file and determine if the CSV file meets the relevant constraints of the policy. If so, the CSV file may be sent to the remote computing device 120 by the egress completor 116.

In a different example, a malicious actor may request that particular data be egressed from the speech processing system (e.g., user audio data in mp4 format). In such an example, the malicious actor may attempt to mask request by specifying that the file format is a CSV file (e.g., in order to attempt to evade some data egress validation filters). In this example, the CSV file decoder may initially be retrieved. However, the CSV file decoder may not be able to parse the mp4 file. Accordingly, the validation component 114 may continue to evaluate the file to be egressed (e.g., the mp4 file) until a decoder is able to recognize the file. Accordingly, in the typical case, an mp4-specific decoder (or an audio file decoder) may recognize the file. The policy associated with mp4 files may be retrieved. In the current example, the policy for mp4 files may state that users at or below a certain privilege level are not authorized to egress mp4 files from the speech processing system. Accordingly, the decoder may access the privilege level of the user. The validation component 114 may determine that the user does not have the requisite privilege level and that it is thus impermissible to egress the mp4 file. An alert and/or action may be generated (e.g., security personnel may be notified).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, from a first initiator, a request to send a first file comprising data organized in a first file format to a remote computing device, the request comprising first file path data identifying a location in non-transitory computer-readable memory of the first file and second data indicating a file type of the first file;
   receiving the first file from a non-transitory computer-readable memory using the first file path data;
   determining a first decoder associated with the first initiator, the first decoder identified using the second data, wherein the first decoder comprises logic effective to recognize data organized using the first file format and extract values from data organized using the first file format;
   determining, using the logic of the first decoder, that the first file is organized using the first file format;
   determining, using a lookup operation, that first policy data is associated with the first decoder, wherein the first policy data represents a first policy for validating data egress;

determining, from the first policy, policy-specific data used by the first policy for validation;
parsing, by the first decoder, the first file to extract third data corresponding to the policy-specific data included in the first file;
determining that the third data conforms to the first policy data by comparing at least one value of the third data to an acceptable value defined by the first policy data;
permitting the first file to be sent to the remote computing device; and
sending the first file to the remote computing device.

2. The method of claim 1, further comprising:
receiving, from a second initiator, a second request to send a second file comprising data organized in a second file format to the remote computing device;
receiving the second file from a non-transitory computer-readable memory;
determining, by the logic of the first decoder, that the second file is organized using a file format that is different from the first file format;
determining, using logic of a second decoder, that the second file is organized using a second file format that is associated with the second decoder; and
determining, using a lookup operation, second policy data representing a second policy that is associated with the second decoder.

3. The method of claim 2, further comprising:
determining, from the second policy, second policy-specific data used by the second policy for validation;
parsing, by the second decoder, the second file to extract fourth data corresponding to the second policy-specific data included in the second file;
determining that the fourth data violates the second policy data by comparing at least one value of the fourth data to a second acceptable value defined by the second policy data; and
generating validation data indicating that sending the second file to the remote computing device is impermissible.

4. A method comprising:
receiving a request from a first source to send first data to a first destination;
determining a first decoder that corresponds to the first source and to a first format of the first data, wherein the first decoder includes logic effective to extract values from data formatted using the first format;
determining a policy associated with the first decoder;
determining second data that is a subset of the first data using the first decoder based at least in part on the policy;
evaluating the second data using the policy;
determining that the first data is permissible for egress from the first source to the first destination based at least in part on the evaluating the second data using the policy; and
sending the first data to the first destination.

5. The method of claim 4, further comprising:
receiving third data indicating a data type of the first data;
determining that the first decoder is associated with the data type; and
determining the first decoder recognizes the first format of the first data.

6. The method of claim 4, further comprising:
sending the first data to a second decoder;
determining that the first format of the first data is unrecognized by the second decoder; and
sending the first data to the first decoder based at least in part on the first format of the first data being unrecognized by the second decoder.

7. The method of claim 4, further comprising:
determining a first constraint defined by the policy;
determining a first value of the second data related to the first constraint; and
determining that the first value satisfies the first constraint, wherein the determination that the first data is permissible for egress from the first source to the first destination is based at least in part on the first value satisfying the first constraint.

8. The method of claim 4, further comprising:
determining a first constraint defined by the policy, wherein the first constraint references a database;
determining a first value of the second data related to the first constraint; and
determining that the first value is found in the database, wherein the determination that the first data is permissible for egress from the first source to the first destination is based at least in part on the first value satisfying the first constraint.

9. The method of claim 4, further comprising:
receiving a first selection of a second policy;
receiving a second selection of a data type for the second policy, wherein the first decoder is associated with the data type; and
storing the second policy in a non-transitory computer-readable memory in association with the data type.

10. The method of claim 4, further comprising:
receiving a second request to send third data to the first destination;
determining that the first decoder corresponds to a second format of the third data;
determining a second policy associated with the first decoder;
determining fourth data that is a subset of the third data using the first decoder based at least in part on the second policy;
evaluating the fourth data using the second policy;
determining, by the second policy, that the first decoder is inappropriate for the third data; and
determining, by a second decoder, that the second format of the third data is recognized.

11. The method of claim 10, further comprising:
determining a third policy associated with the second decoder;
generating fifth data by using the second decoder to parse the second data according to the third policy;
evaluating the fifth data using the third policy; and
determining that the third data is impermissible to send to the first destination.

12. The method of claim 4, further comprising:
receiving a second request to send third data to the first destination;
determining that the first decoder corresponds to a second format of the third data;
determining the policy associated with the first decoder;
determining fourth data that is a subset of the third data using the first decoder based at least in part on the policy;
determining that the fourth data violates at least one constraint of the policy; and
generating fifth data indicating that the third data is impermissible to send to the first destination.

13. A system comprising:
at least one processor; and
non-transitory computer-readable memory storing instructions that, when executed by the at least one processor, are effective to:
receive a request from a first source to send first data to a first destination;
determine a first decoder that corresponds to the first source and to a first format of the first data, wherein the first decoder includes logic effective to extract values from data formatted using the first format;
determine a policy associated with the first decoder;
determine second data that is a subset of the first data using the first decoder based at least in part on the policy;
evaluate the second data using the policy;
determine that the first data is permissible for egress from the first source to the first destination; and
send the first data to the first destination.

14. The system of claim 13, the non-transitory computer-readable memory storing further instructions that, when executed by the at least one processor, are further effective to:
receive third data indicating a data type of the first data;
determine that the first decoder is associated with the data type; and
determine the first decoder recognizes the first format of the first data.

15. The system of claim 13, the non-transitory computer-readable memory storing further instructions that, when executed by the at least one processor, are further effective to:
send the first data to a second decoder;
determine that the first format of the first data is unrecognized by the second decoder; and
send the first data to the first decoder based at least in part on the first format of the first data being unrecognized by the second decoder.

16. The system of claim 13, the non-transitory computer-readable memory storing further instructions that, when executed by the at least one processor, are further effective to:
determine a first constraint defined by the policy;
determine a first value of the second data related to the first constraint; and
determine that the first value satisfies the first constraint, wherein the determination that the first data is permissible for egress from the first source to the first destination is based at least in part on the first value satisfying the first constraint.

17. The system of claim 13, the non-transitory computer-readable memory storing further instructions that, when executed by the at least one processor, are further effective to:
determine a first constraint defined by the policy, wherein the first constraint references a database;
determine a first value of the second data related to the first constraint; and
determine that the first value is found in the database, wherein the determination that the first data is permissible for egress from the first source to the first destination is based at least in part on the first value satisfying the first constraint.

18. The system of claim 13, the non-transitory computer-readable memory storing further instructions that, when executed by the at least one processor, are further effective to:
receive a first selection of a second policy;
receive a second selection of a data type for the second policy, wherein the first decoder is associated with the data type; and
store the second policy in the non-transitory computer-readable memory in association with the data type.

19. The system of claim 13, the non-transitory computer-readable memory storing further instructions that, when executed by the at least one processor, are further effective to:
receive a second request to send third data to the first destination;
determine that the first decoder corresponds to a second format of the third data;
determine a second policy associated with the first decoder;
determine fourth data that is a subset of the third data using the first decoder based at least in part on the second policy;
evaluate the fourth data using the second policy;
determine, by the second policy, that the first decoder is inappropriate for the third data; and
determine, by a second decoder, that the second format of the third data is recognized.

20. The system of claim 13, the non-transitory computer-readable memory storing further instructions that, when executed by the at least one processor, are further effective to:
receive a second request to send third data to the first destination;
determine that the first decoder corresponds to a second format of the third data;
determine the policy associated with the first decoder;
determine fourth data that is a subset of the third data using the first decoder based at least in part on the policy;
determine that the fourth data violates at least one constraint of the policy; and
generate fifth data indicating that the third data is impermissible to send to the first destination.

* * * * *